US008131690B2

(12) United States Patent
Hoile et al.

(10) Patent No.: US 8,131,690 B2
(45) Date of Patent: Mar. 6, 2012

(54) PUBLISHING AND RETRIEVAL OF DATA ITEMS AMONGST A NETWORKED COMMUNITY OF COMPUTER USERS

(75) Inventors: Cefn R Hoile, Suffolk (GB); Erwin R Bonsma, Eindhoven (NL)

(73) Assignee: British Telecommunications public limited company, London (GB)

( * ) Notice: Subject to any disclaimer, the term of this patent is extended or adjusted under 35 U.S.C. 154(b) by 830 days.

(21) Appl. No.: 11/886,845

(22) PCT Filed: Mar. 23, 2006

(86) PCT No.: PCT/GB2006/001080
§ 371 (c)(1),
(2), (4) Date: Sep. 21, 2007

(87) PCT Pub. No.: WO2006/100499
PCT Pub. Date: Sep. 28, 2006

(65) Prior Publication Data
US 2009/0030881 A1    Jan. 29, 2009

(30) Foreign Application Priority Data

Mar. 23, 2005   (EP) ................................. 05251790

(51) Int. Cl.
*G06F 7/00*    (2006.01)
(52) U.S. Cl. .................................................. 707/694
(58) Field of Classification Search ............... 707/694
See application file for complete search history.

(56) References Cited

U.S. PATENT DOCUMENTS 7,143,076 B2 * 11/2006 Weinberg et al. ................ 1/1
2005/0008001 A1 * 1/2005 Williams et al. ............ 370/352

FOREIGN PATENT DOCUMENTS

WO       03/034669 A1    4/2003

OTHER PUBLICATIONS

International Search Report for PCT/GB2006/001080 completed May 31, 2006.

* cited by examiner

*Primary Examiner* — Truong Vo
(74) *Attorney, Agent, or Firm* — Nixon & Vanderhye P.C.

(57) ABSTRACT

Automatic publishing and retrieval in a networked community of computers based on a Small World Adaptive Network (SWAN) type of network. Each computer installs a program which automatically scans data items in its computer's environment to find unique IDs in accordance with UID templates. For each data item found containing a UID, a data record is created comprising the UID associated with the network address of the data item. If permitted by a ruleset, that data record is published to the network by creating a node having the (hashed) UID as its identity or by adding the network address of that data item to common ID lists of existing nodes having that same UID identity. A search request in respect of a UID will find a node and obtain all the network addresses in its list, enabling the requester to send retrieval requests for each corresponding data item.

14 Claims, 6 Drawing Sheets

173A

| | |
|---|---|
| 173B<br>Establish Profile | 173K<br>Create tree |
| 173C, 173C'<br>Software probes | 173L<br>Annotation |
| 173D<br>Publish permissions<br>173D'<br>Publishing process | 173M<br>Assert |
| 173E,<br>Retrieve permissions<br>173E'<br>Retrieval process | 173N<br>Updating process |
| 173F<br>Disclose permissions | 173O<br>Page retrieval process |
| 173G<br>Search parameters<br>173G'<br>Search process | 173P<br>Call maker process |
| 173H<br>Autoscan process | 173Q<br>Service launch |
| 173J<br>Alert parameters | 173R<br>Service configuration |

Fig. 7

PUBLISHING AND RETRIEVAL OF DATA ITEMS AMONGST A NETWORKED COMMUNITY OF COMPUTER USERS

This application is the U.S. national phase of International Application No. PCT/GB2006/001080, filed 23 Mar. 2006, which designated the U.S. and claims priority to European Patent Application No. 05251790.1, filed 23 Mar. 2005, the entire contents of each of which are hereby incorporated by reference.

The present invention lies in the field of data handling, and relates particularly but not exclusively to the publishing and retrieval of data items amongst a networked community of computer users.

In the field of data handling, an Internet service daemon, known as an inetd daemon or the super daemon (subsystem), is the server process for Internet standard services. The inetd daemon operates in conjunction with a configuration-file, referred to as the inetd.conf file, which lists the services that inetd daemon is to provide and describes to the inetd daemon how Internet service requests on Internet sockets should be handled.

The inetd daemon reads the configuration-file and default settings once when it starts up and rereads them again whenever it receives a hangup signal, SIGHUP. New services can be activated and existing services can be deleted or modified by editing the configuration-file and then sending inetd a SIGHUP signal. After it receives the SIGHUP signal, inetd reads the configuration-file and, for each service listed, binds to that service's respective Internet socket (TCP or UDP) to listen for connections. The inetd daemon might have to wait to bind if another standalone server or "wait" wait-status server started by inetd is already listening on the same socket.

When the inetd daemon receives a request on one of these sockets, it knows from the identity of the socket which service corresponds to that socket and then either handles the service request itself (for internal simple Internet, services, including echo, discard, chargen (character generator), daytime (human-readable time), and time (machine-readable time)), or invokes and schedules the appropriate daemon (subserver), for example, ftpd, rlogind, rexecd, rshd, talkd, telnetd, and uucpd. It will be appreciated that the inetd daemon is merely a reactive subsystem which waits until its computer receives a request on a service socket, uses its translation facility to translate the identity of that socket to a service name, and then invokes the daemon for that service.

Details of the inetd daemon have been published on the Internet at bama.ua.edu/cgi-bin/man-cgi?inetd+1 M, and details of the configuration-file have been published on the Internet at bama.ua.edu/cgi-bin/man-cgi?inetd.conf+4.

In one aspect, the present invention seeks to provide a method of enabling a computer user readily and, preferably, automatically to provide access for other computer users, connected to the same common network, to certain data items in his computing environment, selected under the control of that user. Thus, the user can in advance define which of the data items in his computing environment (including "permanent" stored items such as document, email messages, diary entries, and "temporary" stored items such as web browsing data) he is willing to make public (give permission for access and retrieval) and those which he wishes to keep private (not give such permission). In another aspect, the present invention seeks to provide a method of enabling a computer user readily and, preferably, automatically to find and, preferably, retrieve data items in the computing environment of other computer users, which data items have been published to the network by those users.

In preferred embodiments, the user is informed of new publications by other users (alerted), and can tailor the alert to specific interests. The user can also "force" information to other users, for example the user can set up an automatic search of the network to find if another user has published a data record relating to a URL of a viewed web page relating to a particular hobby, and can automatically retrieve user contact details associated with that published data record and can automatically send directly to that other user to announce his common interest in that hobby.

According to the present invention, there is provided a method or computer as set out in the accompanying claims. Further inventive aspects of the invention are described below and set out in the drawings.

Preferred embodiments of methods in accordance with the present invention will now be described by way of example with reference to the drawings in which:

FIG. 7 shows a schematic diagram of component functions of the Networker program of a preferred embodiment of the present invention.

Figure 1:
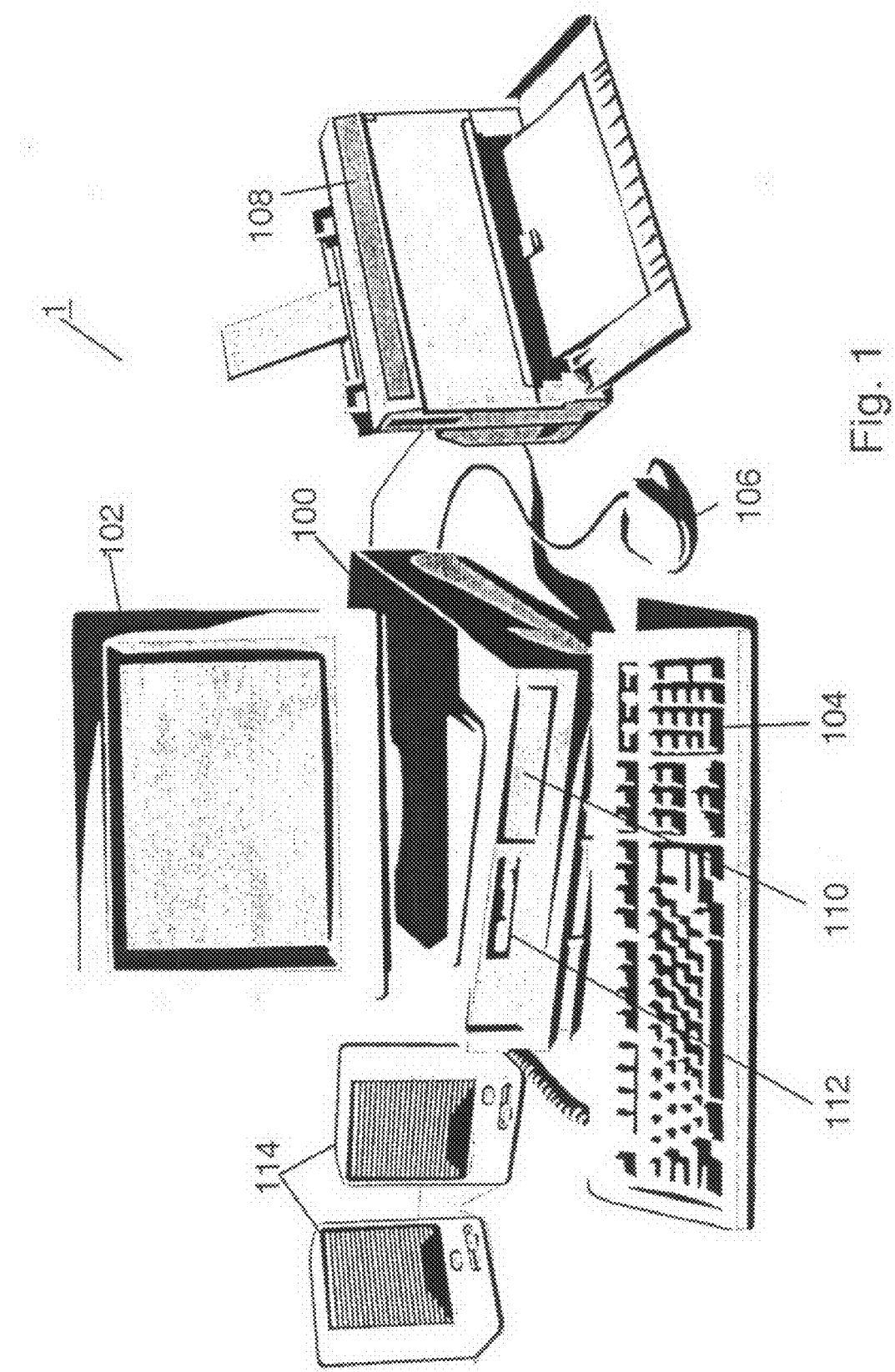
FIG. 1 shows a general purpose computer system which provides the operating environment of embodiments of the present invention.

FIG. 1 shows a general purpose computer system forming part of a distributed computing environment which provides the operating environment of embodiments of the present invention. Later, the operation of the embodiments of the present invention will be described in the general context of computer executable instructions, such as program modules, being executed by a computer. Such program modules may include processes, programs, objects, components, data structures, data variables, or the like that perform tasks or implement particular abstract data types. Moreover, it should be understood by the intended reader that the invention may be embodied within distributed computing environments comprising computer systems other than that shown in FIG. 1, and in particular hand held devices, notebook computers, main frame computers, mini computers, multi processor systems, etc. Within a distributed computing environment, multiple computer systems are connected to a communications network and individual program modules of the invention may be distributed amongst the computer systems.

With specific reference to FIG. 1, a general purpose computer system 1, hereinafter referred to as a computer, forming part of the operating environment of an embodiment of an invention, and which is generally known in the art comprises a desk-top chassis base unit 100 within which is contained the computer power unit, mother board, hard disk drive or drives, system memory, graphics and sound cards, as well as various input and output interfaces. Furthermore, the chassis also provides a housing for an optical disk drive 110 which is capable of reading from and/or writing to a removable optical disk such as a CD, CDR, CDRW, DVD, or the like. Furthermore, the chassis unit 100 also houses a magnetic floppy disk drive 112 capable of accepting and reading from and/or writing to magnetic floppy disks. The base chassis unit 100 also has provided on the back thereof numerous input and output ports for peripherals such as a monitor 102 used to provide a visual display to the user, a printer 108 which may be used to provide paper copies of computer output, and speakers 114 for producing an audio output. A user may input data and commands to the computer system via a keyboard 104, or a pointing device such as the mouse 106.

It will be appreciated that FIG. 1 illustrates an exemplary embodiment only, and that other configurations of computers are possible which can be used with the present invention. In particular, the base chassis unit 100 may be in a tower configuration, or alternatively the computer 1 may be portable in that it is embodied in a laptop or notebook configuration. Other configurations such as personal digital assistants or even mobile phones may also be possible.

Figure 2:
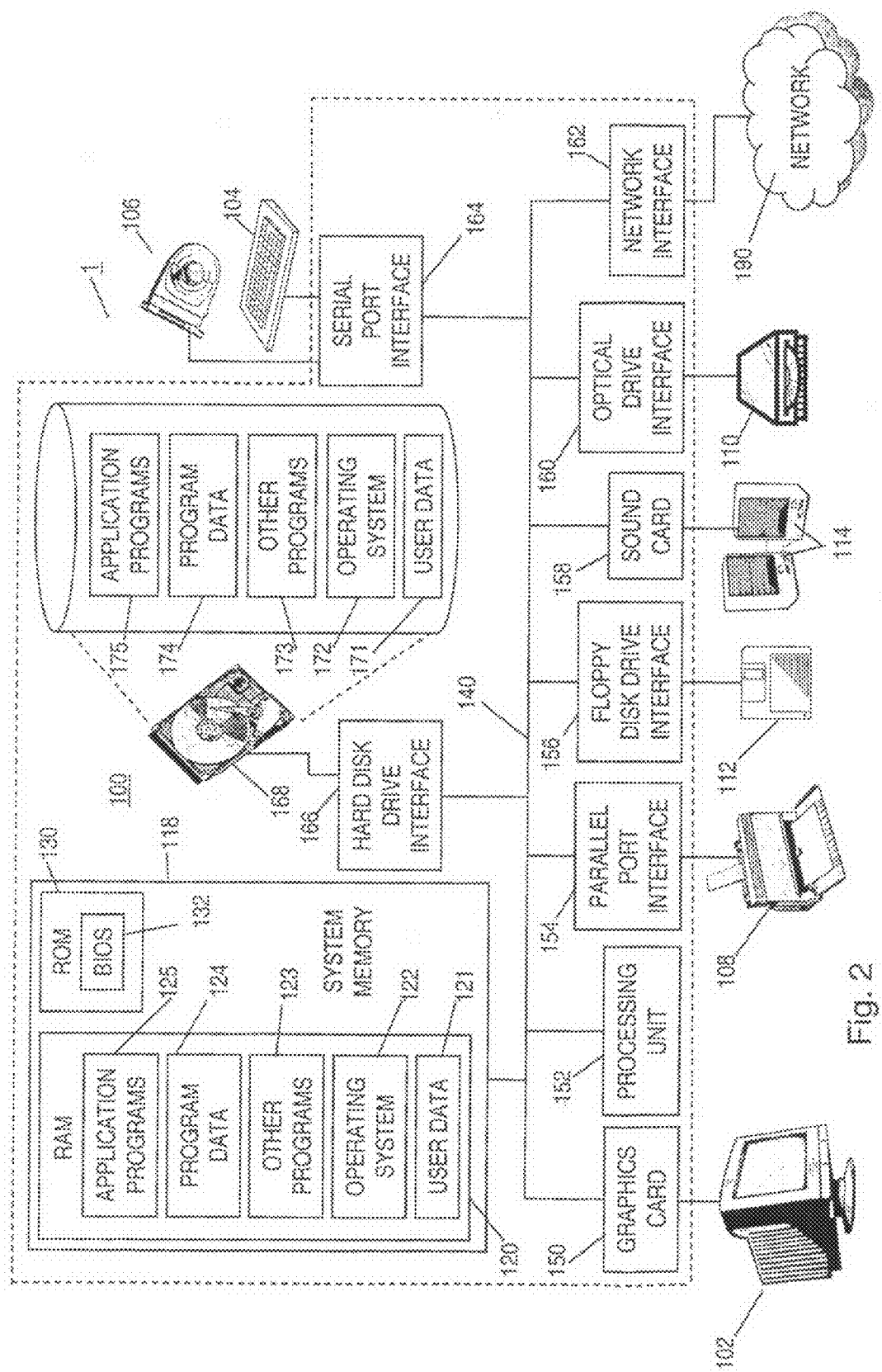
FIG. 2 shows a system block diagram of the system components of the computer system of FIG. 1.

FIG. 2 shows a system block diagram of the system components of the computer 1. Those system components located within the dotted lines are those which would normally be found within the chassis unit 100.

With reference to FIG. 2, the internal components of the computer 1 include a mother board upon which is mounted system memory 118 which itself comprises random access memory 120, and read only memory 130. In addition, a system bus 140 is provided which couples various system components including the system memory 118 with a processing unit 152. Also coupled to the system bus 140 are a graphics card 150 for providing a video output to the monitor 102; a parallel port interface 154 which provides an input and output interface to the system and in this embodiment provides a control output to the printer 108; and a floppy disk drive interface 156 which controls the floppy disk drive 112 so as to read data from any floppy disk inserted therein, or to write data thereto. In addition, also coupled to the system bus 140 are a sound card 158 which provides an audio output signal to the speakers 114; an optical drive interface 160 which controls the optical disk drive 110 so as to read data from and write data to a removable optical disk inserted therein; and a serial port interface 164, which, similar to the parallel port interface 154, provides an input and output interface to and from the system. In this case, the serial port interface provides an input port for the keyboard 104, and the pointing device 106, which may be a track ball, mouse, or the like.

Additionally coupled to the system bus 140 is a network interface 162 in the form of a network card or the like arranged to allow the computer 1 to communicate with other computers over a network 19*b*. The network 190 may be a local area network, wide area network, local wireless network, the public switched telephone network (PSTN) or the like. In particular, IEEE 802.11 wireless LAN networks may be of particular use to allow for mobility of the computer. The network interface 162 allows the computer 1 to form logical connections over the network 190 with other computers such as servers, routers, or peer-level computers, for the exchange of programs or data.

In addition, there is also provided a hard disk drive interface 166 which is coupled to the system bus 140, and which controls the reading from and writing to of data or programs from or to a hard disk drive 168. All of the hard disk drive 168, optical disks used with the optical drive 110, or floppy disks used with the floppy disk 112 provide non-volatile storage of computer readable instructions, data structures, program modules, and other data for the computer system 1. Although these three specific types of computer readable storage media have been described here, it will be understood by the intended reader that other types of computer readable media which can store data may be used, and in particular magnetic cassettes, flash memory cards, tape storage drives, digital versatile disks, or the like.

Each of the computer readable storage media such as the hard disk drive 168, or any floppy disks or optical disks, may store a variety of programs, program modules, or data. In particular, the hard disk drive 168 in the embodiment particularly stores a number of application programs 175, application program data 174, other programs 173 required by the computer system 1 or the user, a computer system operating system 172 such as Microsoft® Windows®, Linux™, Unix™, or the like, as well as user data in the form of files, data structures, or other data 171. The hard disk drive 168 provides non-volatile storage of the aforementioned programs and data such that the programs and data can be permanently stored without power. The other programs 173 include a program for implementing methods of the present invention, referred to as the Networker program by the inventor, and described later, and the user data 171 includes a Personal Details document, as described later. In a variant, the applications programs 175 contain program or programs for implementing methods of the present invention. The Networker program is given the reference numeral 173A, and its component parts are given reference numerals 173B, 173C etc. as described below.

In order for the computer 1 to make use of the application programs or data stored on the hard disk drive 168, or other computer readable storage media, the system memory 118 provides the random access memory 120, which provides memory storage for the application programs, program data, other programs, operating systems, and user data, when required by the computer 1. When these programs and data are loaded in the random access memory 120, a specific portion of the memory 125 will hold the application programs, another portion 124 may hold the program data, a third portion 123 the other programs, a fourth portion 122 the operating system, and a fifth portion 121 may hold the user data. It will be understood by the intended reader that the various programs and data may be moved in and out of the random access memory 120 by the computer as required. More particularly, where a program or data is not being used by the computer, then it is likely that it will not be stored in the random access memory 120, but instead will be returned to non-volatile storage on the hard disk 168.

The system memory 118 also provides read only memory 130, which provides memory storage for the basic input and output system (BIOS) containing the basic information and commands to transfer information between the system elements within the computer 1. The BIOS is essential at system start-up, in order to provide basic information as to how the various system elements communicate with each other and allow the system to boot-up.

Whilst FIG. 2 illustrates one embodiment of a computer of a distributed computing environment of the invention, it will be understood by the skilled person that other peripheral devices may be attached to the computer, such as, for example, microphones, joysticks, game pads, scanners, or the like. In addition, with respect to the network interface 162, we have previously described how this is preferably a wireless LAN network card, although equally it should also be understood that the computer 1 may be provided with a modem attached to either of the serial port interface 164 or the parallel port interface 154, and which is arranged to form logical connections from the computer system 1 to other computers via the public switched telephone network (PSTN).

The preferred embodiment is performed in a network of interconnected computers 1 of the Small World Adaptive Network (SWAN) type of network, as described in detail in European Patent Application No. 02801398.5 (Publication No. 1436957) and modified as described below.

Figure 3:
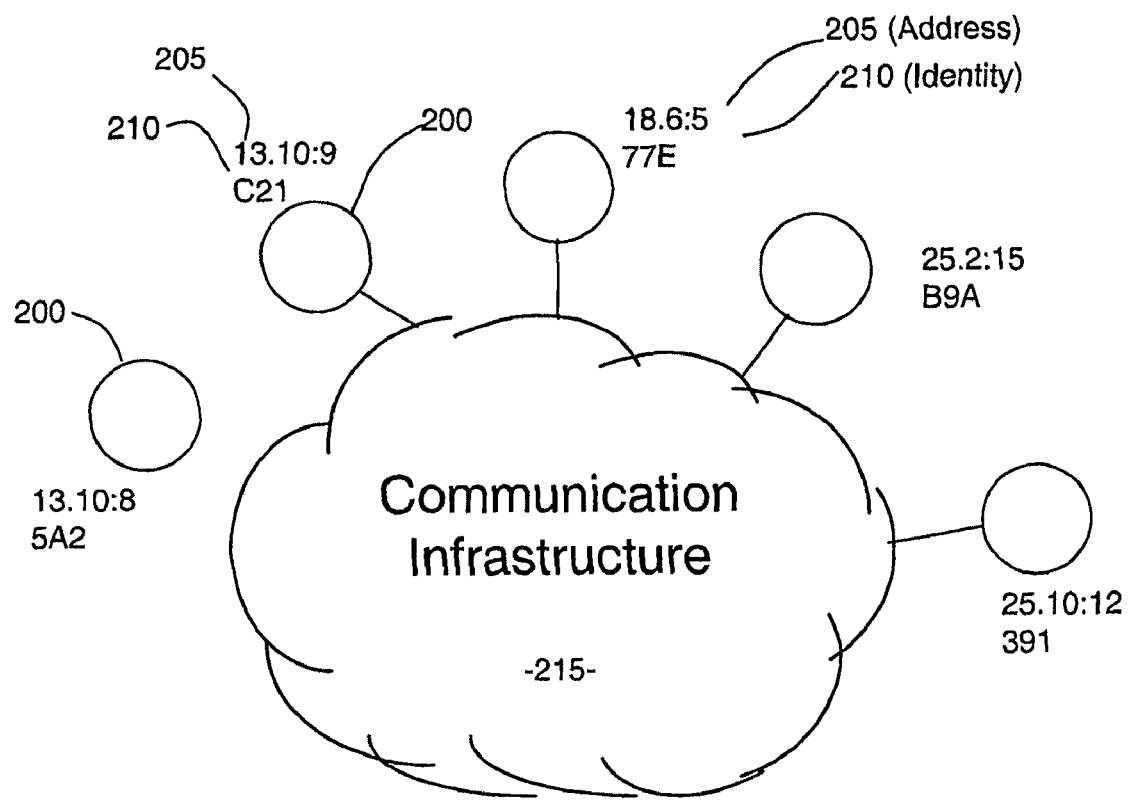
FIG. 3 shows a schematic view of a Small World Adaptive Network (SWAN) type of network for operating the method of the present invention.

Referring to FIG. 3, a SWAN network comprises a set of nodes 200 connected by a communication infrastructure 215 (e.g. the network 190) comprising computers 1, on which the nodes 200 reside, together with local access networks and the Internet.

The skilled person will understand that the computers 1 constitute computing nodes that have processing, storage and communication capabilities, and also constitute nodes within the communications infrastructure 215 via which messages can be sent between the computers 1.

The skilled person will also understand the nodes 200 constitute virtual nodes which belong to a virtual network. The distinction is important because a computing node is able to have two or more virtual nodes (possibly belonging to different virtual networks) associated with it. As its name implies, a virtual node does not exist in any physical sense: rather, as will become clear presently, its existence is established by stored data which define links between virtual nodes and, hence, also define the virtual network to which it belongs.

Thus, a virtual node must be associated with, referred to as being resident on, a computing node, which provides it with processing, storage and communication capabilities: references to the sending, receiving and processing of messages by a virtual node refer to such sending, receiving or processing by the computing node on behalf of the virtual node.

Each node 200 can be thought of as comprising a two-part data record 202 in which one part 202a constitutes its identity (ID) 210 and the other part 202b constitutes an address 205 in the infrastructure in the form of an Internet Protocol (IP) address including a port number and a service ID. The data record 202 of a node 200 constitutes a published UIDp:UIDa pair of the present invention, the identity (ID) 210 constituting a publication unique ID (UIDp, or publication UID), and the address 205 constituting an associated unique ID (UIDa, or in this case, location UID). As will be understood from the examples to be described later, the UIDa is commonly in the form of the network address of a retrievable data item on a computer 1, but is not restricted to this and can be in any of a number of other forms.

Each node 200, by virtue of the association with its host computer 1, has access to processing, storage and communication capabilities and is configured to send and receive a set of message types via the infrastructure 215 to any other such node 200 by specifying an address 205 in the infrastructure 215 for the target node. Each computer 1 can have many thousand resident nodes 200.

In the context of the present invention, as will be described in detail later, the node identities 210 are fixed length bitstrings (160 bits) produced by applying a hashing algorithm (in this example, the hashing algorithm known as SHA-1, a known standard) to practical UIDs, for example URLs and postcodes, and are associated with, inter alia, data items hosted by the computers on which those nodes reside and are available for retrieval by other computers of the network. The term data item is used herein in a broad sense rather than a limited sense, and includes software capable of providing a service, and the term retrieval in this case means that the hosted service is made available to users at remote computers of the network. Other associations will be described later.

Figure 4:
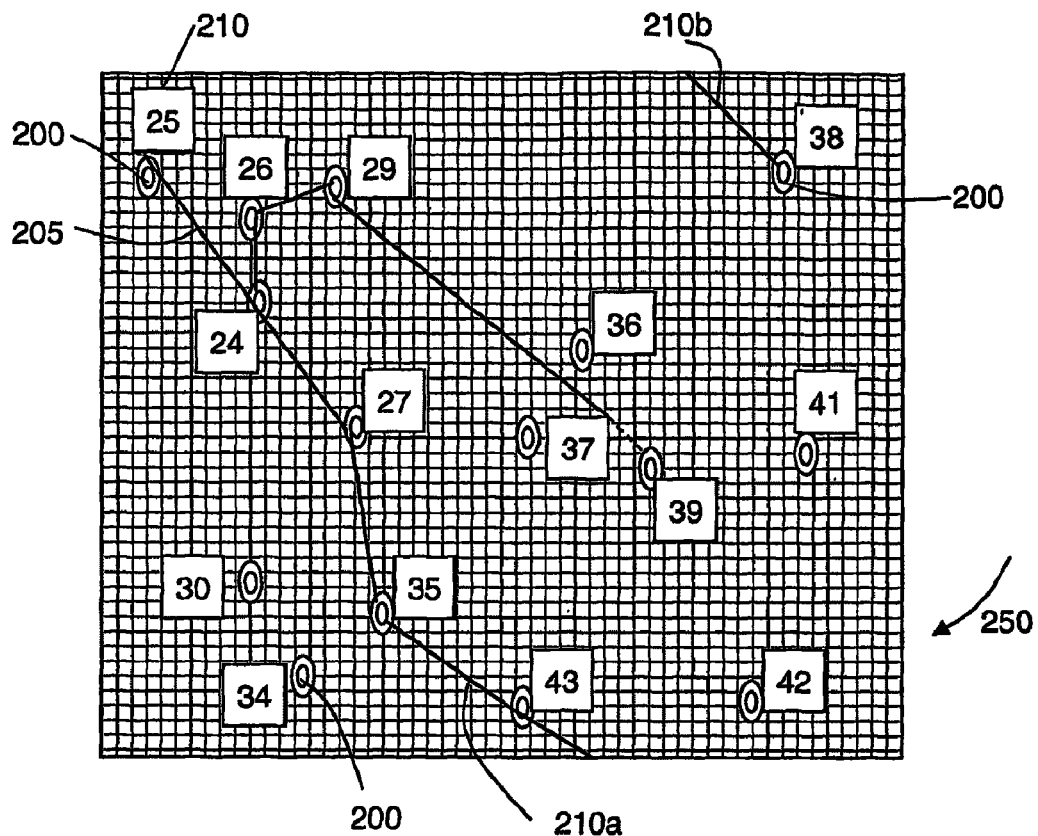
FIG. 4 is a map representing the location of nodes in ID space in the SWAN network of FIG. 3.

FIG. 4 shows co-ordinate space 250, referred to hereafter as ID space 250, and a plurality of nodes 200 represented by their IDs 210 at locations in ID space 250. Where a node 200 knows the network address 205 of another node 200, this is shown as a link 225, 220a, 220b on FIG. 4, where the two nodes can send messages to each other using the infrastructure 215. If the link is one-way only, in that a first node has the address for a second node but the second node does not have the address for the first, this is shown as a link, which is partly dotted. An example is the link between nodes 29 and 39. The ID space 250 is Euclidean in terms of the distance measure used to calculate the distance between any two co-ordinates in the ID space 250 and its edges "wrap" in ID space 250. This can be seen in that the link 220a, 220b from node 43 to node 38 is "continuous" across the disjunction of the bottom and top of the ID space 250.

Thus, each node identity 210, represented by co-ordinates (location) in co-ordinate space 250, is independent of network address and physical location.

Figure 5:
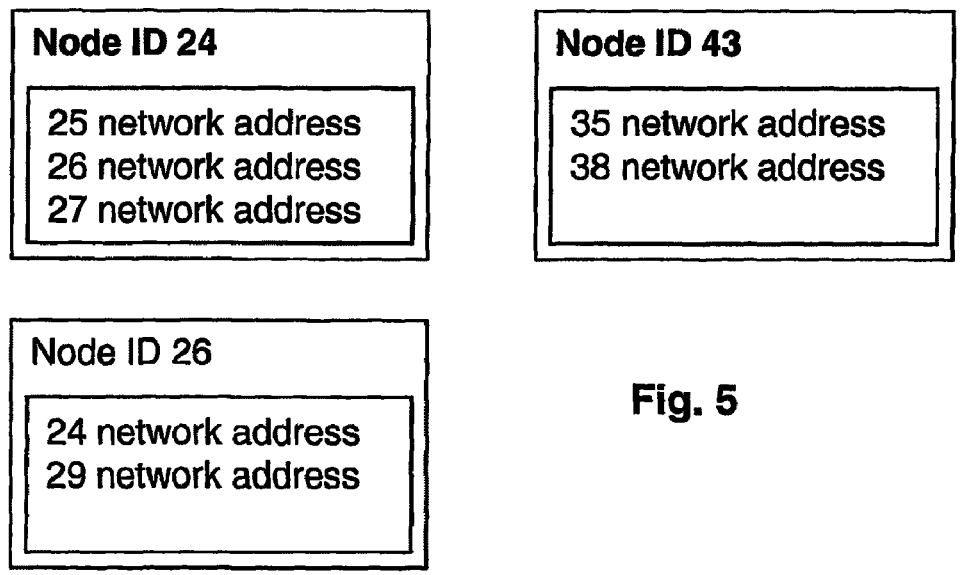
FIG. 5 shows link lists of three of the nodes shown in FIG. 3.

Nodes represented in ID space 250 have two characteristics. Firstly, each node 200 maintains a link list containing a few short-range links and a few long-range links, where a link is an alternative term for the network address of another node 200, conveniently but not necessarily in the form of the record 202 of that other node 200. Secondly, there is a predictable relationship (the hashing algorithm) between every node's ID 210 and its co-ordinates in ID space 250. FIG. 5 shows the respective link lists of the nodes having the IDs 24, 26 and 43. The node ID 24 link list contains the network addresses of nodes having IDs 25, 26 and 27; the node ID 26 link list contains the network addresses of nodes having IDs 24 and 29; and the node ID 43 link list contains the network addresses of nodes having IDs 35 and 38.

If a node (the enquiring node) needs to communicate with a node (the target node) for which it has an identity (e.g. supplied by a user in raw UID form, i.e. not hashed) but no address, it uses the hashing algorithm to translate that target node's ID 210 into co-ordinates in ID space 250 and then performs calculations to find which of the nodes in its list (referred to as the "nearest node") is located in ID space nearest to the target node. These calculations comprise first determining its own distance from the target node in ID space, and then the respective distances for each of the nodes in its list. Assuming that the enquiring node now determines that one of its list of nodes is the nearest node, it initiates the transmission, through the infrastructure to that nearest node, of a "FIND" request which contains the target node's ID 210 (now in its fixed length bitstream hashed form), and the ID and network address of the enquiring node.

When a node (in this case, the "nearest node" of the enquiring node's list and now referred to as the receiving node) receives a FIND request, it retrieves the target node's ID 210 from the FIND request and first checks whether there is a match between its own ID and the target node's ID. If there is no match, it then proceeds to find its respective "nearest node", performing calculations as described above for the enquiring node. Thus, the FIND message is passed onwards in the same manner, always to a receiving node whose ID co-ordinates represent a location in ID space which is nearer to the location of the target node's ID in ID space than that of the forwarding receiving node.

At some point, the propagation of the FIND request will finish at a node (referred to as the final node) which either (1) has an ID matching the target node's ID, or (2) is not able to find in its list a "nearest node". Since the FIND request contains the ID and network address of the enquiring node, that final node can now return to the enquiring node over the infrastructure 215 a "FOUND" message containing its own ID and network address, i.e. its data record part 202b, and the target node's ID. The enquiring node can now determine whether that final node is the desired target node, and if so direct communication can subsequently take place using the routing mechanisms of the infrastructure 215.

As a more detailed example of the mechanism by which nodes retrieve network addresses of nodes with which they wish to communicate, reference is now made to nodes 24, 26 and 43 shown in FIG. 5. We assume that node 43 requires the network address for node 24, which is a node for which it does not hold any information. Accordingly, node 43 converts "24" to co-ordinates in ID space 250, and identifies which node, of those for which it has information, is closer to the target node 24 in ID space 250. In this example, node 35 is closer to node 24, so node 43 sends a "FIND" message to node 35. Node 35 repeats the process, forwarding the "FIND" message to node 27, which in turn forwards it to node 24. Node 24 recognises itself to be the target node and uses details of the initiating node (node 43) to return a "FOUND" message to node 43. Node 43 can now communicate directly with node 24.

The set of message types includes PUSH and PULL updating messages which are initiated by nodes periodically to improve the identity network. The updating of the SWAN network is not relevant to the present invention and the updating messages will not be described further.

The basic structure of the SWAN network as described so far enables a user (the enquiring user) at a computer 1 to find out whether the network includes a node (the target node) having an ID of interest to that user, and, if so, to obtain a network address relating to that ID and which the user can employ as a destination address for messages. The user might submit that ID, via a search interface, to a SWAN network node resident on his computer 1, and that node will then perform as the enquiring node described above. In a variant embodiment, the user's computer 1 is arranged to generate a hashed ID and send a FIND message via the infrastructure 215. In this case, the "From" field of the FIND message contains a network address of the computer, instead of containing a node ID.

The SWAN network requires modification to enable the operation of the present invention.

Figure 6:
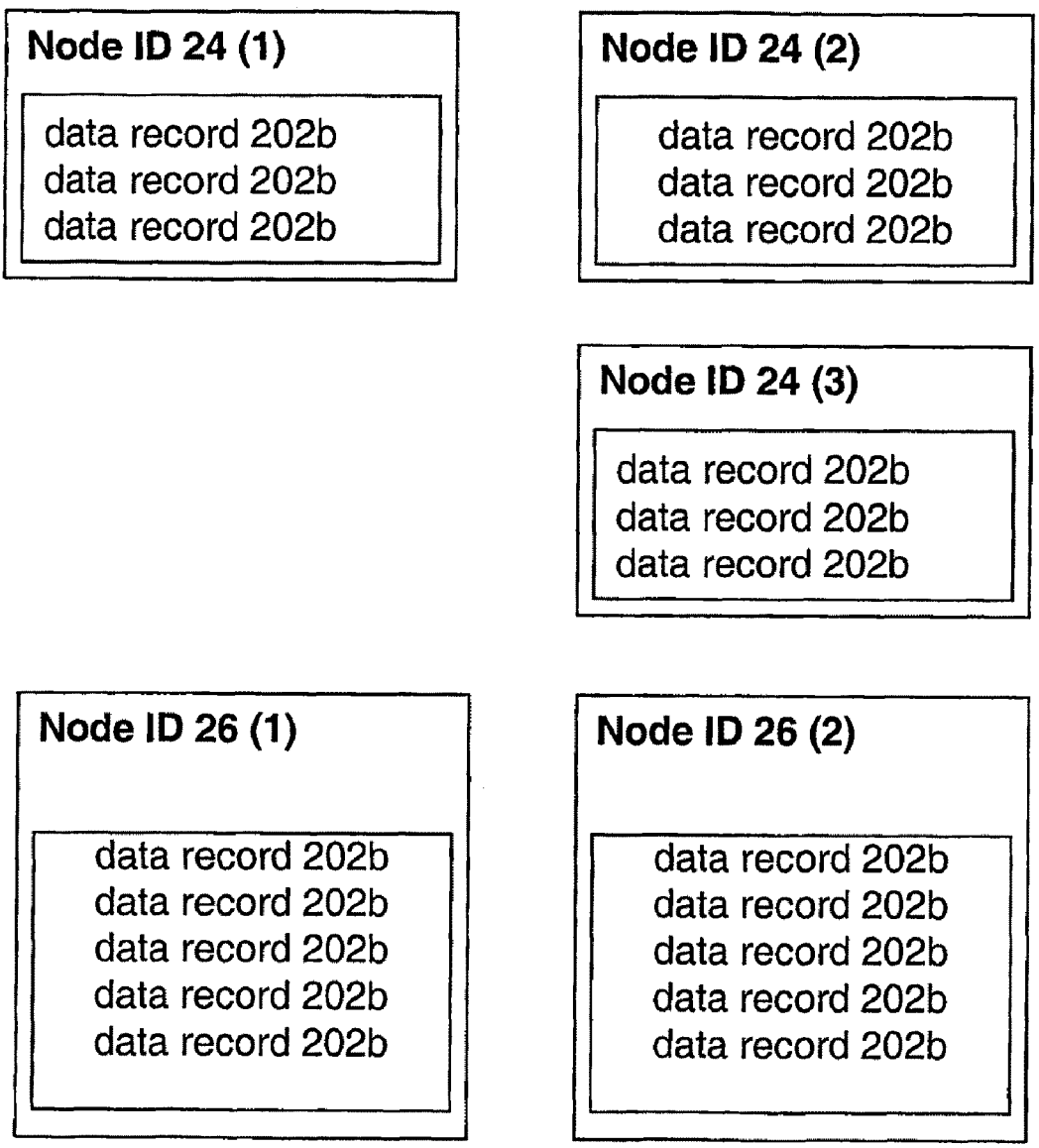
FIG. 6 shows common ID lists of some of the nodes of the present invention.

A first modification relates to the existence in the network of a plurality of the nodes 200 having the same common ID, and each of these nodes maintains, actually or effectively, a respective list (referred to as a common ID list and as shown in FIG. 6) of the data record parts 202b, usually network addresses, of the nodes of that plurality.

FIG. 6 shows three nodes having the same common ID, 24 (1), 24 (2) and 24 (3); and two of five nodes having the same common ID, 26 (1) and 26 (2). For simplicity, nodes ID 26 (3) to 26 (5) are not shown in FIG. 6.

Node ID 24 (1) has a common ID list containing its own network address and the network address of nodes ID 24 (2) and 24 (3); node ID 24 (2) has a common ID list containing its own network address and the network address of nodes ID 24 (1) and 24 (3); and node ID 24 (3) has a common ID list containing its own network address and the network address of nodes ID 24 (1) and 24 (2). Similarly, node ID 26 (1) has a common ID list containing its own network address and the network address of nodes ID 26 (2) to 26 (5); node ID 26 (2) has a common ID list containing its own network address and the network address of nodes ID 26 (1) and 26 (3) to 26 (5), and correspondingly for the three nodes ID 26 (3) to 26 (5) not shown.

Thus, in the modified SWAN network a final node whose ID matches the FIND ID can return a FOUND message containing the addresses in its common ID list, and the enquiring node can then send messages to that plurality of nodes. It will be understood that in practice these messages will be sent and received by the computers 1 on which the enquiring node and this plurality of nodes are resident. In one variant embodiment, the final node does not include these addresses in the FOUND message and the enquiring node can retrieve them by a subsequent request. In another variant embodiment, the common ID list of a node does not contain that node's own network address. Thus, to obtain the network addresses of all that plurality of nodes, the enquiring node will need to add the address contained in the From field in the header of the FOUND message to the contents of the received common ID list.

An example of the use of such a modified SWAN network would be where the common ID of a plurality of the nodes 200 is the hash of a URL of a web page, and the common ID list contains the network addresses of corresponding data items containing respective comments (also known as Annotations) relating to that page and being stored on users' computers 1.

Within the modified SWAN network, as nodes are created and deleted the common ID lists are updated by a common ID list updating process 173N.

In the example just described, the entries in the common ID lists of those nodes are network addresses which the enquiring node can use to send individual Retrieve messages and obtain the respective comments.

As mentioned, a UID, i.e. either a UIDp or a UIDa, can have any of the forms of the non-exhaustive list given, depending upon the particular situation. In one example, a user called Joe Public might wish other users to find and retrieve his Personal Details document stored on his computer 1. He publishes a data record of which the first part 202a, the UIDp, contains his name "Joe Public" and the second part 202b, the UIDa, contains the network address of that Personal Details document.

In another example, a club having a web site might offer free membership. The web site will have a membership page, and while the user is viewing that page he can invoke the Assert function. An Assert window is now displayed having two boxes, one for the UIDp and the other for the UIDa. In this particular case, because the user invoked the Assert function while the page was being displayed, the URL of that page is automatically entered in the UIDa box, and the cursor is positioned at the start of the UIDp box waiting for data entry by the user.

The user now clicks on a "Change" button in the Assert window to interchange the positions of the URL and cursor, and enters his name "Joe Public" in the UIDa box. Once entry is complete, the Assert function calls the Publish Node function and a node 200 is created for the Published Association "URL:Joe Public". Assuming that there is a plurality of existing nodes 200 having this identity, "URL", then their common ID lists are updated to include this new data record part 202b containing "Joe Public". Other users, wishing to see a list of current members of that club, can perform a Search using that URL for the membership page and retrieve a common ID list containing all the names of the current membership.

Further examples of the use of the present invention, and a description of an example embodiment of a program for performing methods of the present invention will now be given.

In order to participate in the operation of the present invention, a user installs a program 173A, given the name Networker by the inventors, on his computer 1 by downloading it from a website, either by directing his browser to the relevant URL, or by clicking on a hyperlink in an email message from someone who already has installed the Networker program on his computer and wishes to encourage the use of the program by others. In variants, he receives it as an attachment of an email message or on a carrier medium, e.g. a floppy disk or a CDROM.

The Networker program can be thought of as comprising a number of functions. A low level description of these functions will not be described as the skilled person in the art does not need to start from the inventor's software code in order to be able to generate his own embodiment of the invention. Indeed, it is common place that the skilled person has his own stock-in-trade of software modules for performing various software procedures, etc. and will prefer his own software to that of others. So the functions of the Networker program will be described only in a high level description.

The functions of the Networker program are
Establish Profile (173B)
  Select pre-defined software probe(s) 173C
  Set permissions for publishing acts, i.e. allowing other users to access the user's data (Publish 173D)
  Set permissions for retrieval acts, i.e. allowing other users to retrieve the user's data (Retrieve 173E)
  Set permissions for disclosure acts, i.e. set of access controls applied to published records and defining the identities of other users who are permitted to access the user's records (Disclose 173F)
  Set parameters for search (Search 173G)
  Set parameters for automatic scan (Autoscan 173H)
  Set parameters for alert, i.e. whether an alert is displayed on the user's computer when a record is accessed by a permitted user (Alert 173J)
  Create user-defined general-purpose software probe(s) 173C'
Create Tree 173K
Annotation 173L
Assert (manually create and publish data record) 173M The Networker program comprises a set of data processing computer processes, including, inter alia, a publishing process 173D', a common ID list updating process 173N, a searching process 173G', a retrieval process 173E', a page retrieval process 173O, a call maker process 173P.

Upon installation, the Networker program installs a set of pre-defined software probes 173C on the user's computer 1. Each pre-defined software probe operates in accordance with a respective predefined detection criterion (also referred to as a template 173C-T), e.g. proper names (both people and places), email addresses, postcodes (i.e. particular formats of alphanumeric characters, explained in detail later), Zip codes, telephone numbers, timestamps, GPS coordinates, calendar schemes and uniform resource locators (URLs).

In accordance with the present invention, each such template 173C-T effectively constitutes a respective set of UIDs that the probe searches for amongst events and documents (collectively referred to as data items) within the computing environment. In other words, any character sequence which matches a template is deemed to be a UID. For example a sequence of numbers which is consistent with the UK National Telephone Numbering Plan constitutes a UK telephone UID, and a character sequence which comprises a protocol known by its initial letters, e.g. http, https, ftp, followed by "://" followed by a host name (e.g. www.apa.org, or expressed in "dotted-decimal" form) constitutes a URL UID.

The Establish Profile function of the Networker program generates a graphical user interface (GUI). This has a Profile tab and a Search tab.

The Profile tab enables the user to establish the configuration of his profile. Clicking on the Profile tab opens a ProfilePanel, which provides for the user to select a default configuration from a number of preset configurations which are compatible with common desktop environments and employ categories of information including documents and those managed by a personal information manager such as Outlook, e.g. email messages, calendar entries, contact records, bookmarks; and also provides for the user to input his name, description and email address to be held in a root record of a hierarchical record tree to be constructed by the Networker program, as will be described later.

The ProfilePanel displays a plurality of ProfileGroup Panels with titles including People, Place, Event, Journey, On Offer, File, Search, Note, Bookmarks and Trail. Initially, the ProfileGroup Panels are in closed state, but clicking on an OpenCloseBox of a ProfileGroup panel opens that ProfileGroup to display one or more ProfileGroup Rows. Each ProfileGroup Row contains a PermissionPanel having a Share check box defining whether or not the data items relating to that ProfileGroup Row are to be shared with anyone else, and other check boxes for selecting the extent of sharing from Everyone, Work, Home, and Work Team.

The Search tab enables the user to set criteria for the search area and the user-defined software probes, e.g. the extent of the search area, the data items to be regarded as private, the selection of the pre-defined software probes 173C, and to request the generation of a general-purpose software probe 173C' tailored in accordance with user-specified search parameters.

One preset configuration defines:
a search ruleset including the pre-defined software probes to be used, the extent of the search area within the computer environment—all stored data (documents, email messages, calendar entries, contact records, bookmarks) and all transient features of the computing environment (web browsing—web page viewing records), and the search type (automatic and continuous monitoring of the computer environment);
a publish ruleset 173D establishing a public section and a private section, including bookmarks, browsing and documents (in a variant, there is only a public section and anything not specified by the public section is deemed to be private);
a disclosure ruleset 173F specifying the identities of other users who are permitted to access the user's published data items, whether those other users are to be authenticated by a password, and whether an alert is displayed for the user when a data item is accessed by such a permitted user; and
a retrieval ruleset 173E for finding published data items on other computers of the network which contain the same UID as a data item found by the search ruleset.

In accordance with its Create Tree function 173K, the Networker program first constructs the basic form of the hierarchical record tree in which the nodes of the tree are formed by data records, as described later. The records forming nodes other than leaf nodes are referred to as container records. Thus, the root node of the tree is constituted by a container record entitled Profile and containing the name, description and email address of the user, which were provided by the user in setting up the profile. This Profile record has three children container records (nodes) at the next level in the tree, namely Documents, Bookmarks and Browsing. The Bookmarks container record contains a Work Bookmarks container record and a Private Bookmarks container record at the next level. The individual records within these lowest level container records are leaf records of the tree.

The Create Tree function associates a respective ruleset with each container record. A ruleset comprises the Publish permissions, Retrieve permissions, and Disclose permissions which have been set by the user under the Establish Profile function.

In the tree, each container record, except for leaf records, is associated with a respective ruleset which defines permissions for publishing acts, retrieval, disclosure acts, and alert.

These rulesets (permissions) are defined by the user via another window of the interface. The user can make such acts dependent upon the context in which the record was created, e.g. the user can permit bookmarks to be published, but not browsing behaviour, and dependent upon the form of the UID, e.g. the user can permit postcodes to be searched but not URLs. In a variant embodiment, leaf records can be assigned a respective ruleset.

The Create Tree function responds to each UID that the Autoscan function 173H finds and generates a respective record containing that UID and information derived from the context in which it was encountered, e.g. file-name and line for data, and time, date and program for behaviour. The hierarchical record tree is then built using the generated records. This tree mirrors the profile, in other words, its root record is entitled Profile and contains the name, description and email address of the user, which are provided by the user in setting up the profile. This root record is a container record having three children container records at the next level in the tree, namely Documents, Bookmarks and Browsing. The bookmark records at the next level under Bookmarks are divided into work bookmarks and private bookmarks, and they are leaf records (they may be alternatively considered as container records without children records).

In this embodiment, a new record will be created and added to the tree as soon as a probe finds a UID in accordance with its search criterion. In variant embodiments, records are not added to the tree one at a time, but in groups or even in a single tree construction operation after all the probes have finished searching. In an alternative embodiment, the user defines public and private sections of each of the categories of data items in his computing environment, and the automatic search area includes all such private sections. The corresponding tree contains both public and private containers as children of a parent container, e.g. a documents container will have children containers—public documents and private documents, and each child container will have its own associated ruleset.

The Assert function 173M of the Networker program is also capable of generating, upon command by the user, an interface, referred to as the Assert window, to enable such records to be created manually. For example, the user might wish to create a record associating a file representing a digital photograph with a postcode or latitude/longitude representing a descriptor of the location where the photograph was taken.

When the Networker program recognises that action is requested in respect of a particular record, e.g. for a newly added bookmark record or for a received retrieval request for a data item, the corresponding leaf record is located in the tree, the associated ruleset is inspected and the Networker program then performs the necessary actions, as required, through invocation of an appropriate one of a set of data processing computer processes. If that record does not have any associated rule, or an associated ruleset is set to null, then the containing record at the next level is inspected. If that has an associated rule for the requested action (publishing, retrieval, disclosure), then that is the governing rule for the requested action. If there is no ruleset at that level, then the ruleset at the next level is inspected, and so on, depending upon the number of levels in the tree, until the root level is reached. If there is no appropriate rule, then the request is ignored and no action is taken.

Typically, the user will set the root ruleset to top level permissions, i.e. search for all UIDs, publish for all UIDs, and provide a prompt, referred to as Alert, to the user for any request to access data. Unless a ruleset at a lower level provides a more restrictive behaviour, the root ruleset will enable all possible links to be found (both to and from remote users), but all data disclosures are controlled by a prompt which tells the user who is trying to read the data, and gives the user an option to deny the request.

In practice, the user is likely to select "prevent publishing" and "prevent access" for the ruleset associated with the Browsing record, but to allow the default behaviour to cascade down to the Bookmarks record, i.e. select a null ruleset for the Bookmarks record.

EXAMPLE SCENARIOS

In an example scenario, suppose that users at computers 1 of the network use a browser to download pages over the Internet. In known manner, for each web page that is viewed by a user, a respective web page viewing record, constituting a data item of the present invention, is stored on his computer 1. This web page viewing record contains in known manner, inter alia, the user's ID, the URL of the page and the start and stop times of viewing. Suppose that the user has, via the ProfilePanel, assigned "Public" status to his web page viewing records.

A "URL" software probe 173C is operative to scan all the data items stored on a user's computer 1, when the probe scans a web page viewing record it finds the URL, captures both the URL and the address of that web page viewing record on the user's computer 1. This data is passed to the Networker program Create Tree 173K which then constructs a tree record comprising the URL, now constituting a publication UID (UIDp) of the present invention, in association with the address, now constituting an association UID (UIDa) of the present invention, and adds that newly created tree record to the Browsing container of the hierarchical tree.

The Browsing container is associated with a ruleset which includes permission for the record to be published to the network. So, the Networker program will then invoke a publishing process 173D' which will create in the modified SWAN network by the SWAN updating process a new node having the URL (and the network address of that web page viewing record), and the common ID lists will be updated for any existing nodes having that URL as their ID.

Suppose that a group of the users are model railway enthusiasts, each of which has assigned "Public" status for his web page viewing records. Suppose that each of the group has visited a home page relating to model railways and having the URL "ptth:\\www.hornbyrailways.com/pages/home.aspx" (referred to as the Model URL) and has a respective web page viewing record stored on his computer 1. Suppose also that at least some of the group have invoked the Annotation function 173L, which caused a text box to appear on their respective monitors 102, and that the users have entered respective annotations, e.g. "I have for sale a Duchess of Atholl loco in original box" and "You are welcome to come and see the railway layout in my loft", which were then stored in corresponding web page viewing records. Note that, in the examples given, URLs are, for typographical reasons, shown with the "//" replaced by "\\", and http is replaced with ptth.

As each respective web page viewing record is created and stored, the respective URL software probes on those users' computers 1 are operative, as described above, resulting in the creation of respective new tree records. In accordance with the Networker program, as each new tree record is processed, the publishing process is invoked and a corresponding node is added to the network. The update mechanism of the network finds all existing nodes having that URL as node ID 210 and adds the respective associated network address to the respective common ID lists. Thus, each member of the group has resident on his computer 1 a respective node having the Model URL as its ID and whose common ID list contains the network addresses of the web page viewing records of the other members of the group. Each member can invoke the Retrieve function 173E' to send respective Retrieve messages to the other members, i.e. using the common ID list of the respective node stored on his computer 1, and retrieve data from their web page viewing records. This data includes the identity of the user, and any respective annotation(s) that he has entered in the corresponding web page viewing record.

In the simplest form of this embodiment of the invention, a user who is not yet a member of the group can join the group by visiting the web page, and the publishing process (also called a Publish Node function) 173D' in combination with the network update mechanism 173N will add his newly created node in respect of the new web page viewing record (i.e. Associated Pair in the form "Model URL:NA") to the network, and update accordingly the common ID lists of any existing nodes having the same ID. It will be appreciated that the common ID list of the newly created node will now contain the network addresses of all other existing nodes having that ID. The network update mechanism 173N is either the SWAN network normal automatic update or is a forced update invoked by the publishing process. It will be appreciated that the present invention is not reliant on any particular network update mechanism and that such network update mechanisms are known to the skilled person. Accordingly, no further details of this will be given.

Alternatively, that user can enter the Model URL in the Search function 173G' to find such an existing node. The Search function will cause a FIND request for the Model URL to be sent into the network. Upon receipt of a FOUND message, the Publish Node function will create a new node in respect of that user-supplied Model URL in association with the network address of a Public status Contact document, constituting a data item of the present invention, previously created by that user and containing, e.g. his name, address, email address, telephone numbers, and any other information that the user is willing for others to know. This Contact document is also referred to as a Personal Details document.

The Alert function 173J is responsive to network updates, and upon the occurrence of a common ID list update of a node resident on his computer, generates the display of an icon on the monitor 102. The Alert function includes the capability for the user to associate a selected icon with a particular node ID. In the case of the group of model railway enthusiasts, an existing member of the group can provide the Model URL to the Alert function and select, or design, an icon in the shape of, say, a railway engine. Thus, when another user becomes a new member of the group either by visiting that web page or by using the Search function as described in the preceding paragraph, the ensuing automatic creation of a new node on that user's computer 1 and the update of the common ID lists (which add that user as a new member of the group) will result in the display of the engine icon on that existing member's monitor 102. The existing member can click on the icon, which triggers the Alert function to retrieve the newly added network address from the corresponding common ID list and provide it to the Retrieve function (also known as a retrieve process) 173E', which sends a message to the newly added member's computer 1 to retrieve data from the data item corresponding to the network address, either the web page viewing record if he visited the web page, or a Contact document as mentioned above.

In another example scenario, suppose that the modified SWAN network is a company intranet and that users at computers 1 of the network are Contract Managers who have stored respective documents, constituting data items of the present invention, relating to contracts with suppliers A and B for supply of a product X. The Contract Managers will have created for each document a respective Comments Annex including information relating to the supplier or the product, which might be of value to other Contract Managers. The reader will appreciate that the following example can be extrapolated with respect to the number of suppliers and the number of products.

Suppose also that each of these Contract Managers has downloaded or otherwise obtained a Networker program, as mentioned above, and that each has created respective user-defined software probes for the suppliers' names "A" and "B" on his respective computer 1. Upon closing such a document, the software probes are triggered and the document is examined for the presence of any such unique identifier. Suppose that a Contract Manager has created and stored on his computer 1 documents D1 to D4 and that, of these, documents D1 and D2 are found to contain A, and documents D3 and D4 are found to contain B. The Publish Node function will now be triggered to update automatically the modified SWAN network by adding nodes corresponding to the Published Associations—A:NA(D1); A:NA(D2); B:NA(D3) and B:NA(D4).

The existence of the contracts and the knowledge from the Comments Annexes would be valuable information for the Contract Managers. Thus, once a Contract Manager has created such a document containing A, the Publish Node function in combination with the network update mechanism will ensure that the corresponding node on his computer 1 has an up-to-date common ID list. The Contract Manager can retrieve all such published documents using the network addresses of the common ID list of a published node on his computer 1. The Contract Manager uses the Search function 173G' to find these documents by entering the unique ID "A" in the Search function to find any existing nodes having a corresponding node ID. The Search function starts by checking nodes on the Contract Manager's own computer 1. This avoids unnecessary transmission of messages into the network. The node having the ID "A" on that computer will recognise that it is a target node and respond with its common ID list. If that Contract Manager had been searching for documents containing A, but had not yet created any such document on his own computer, then a FIND request for the unique ID "A" would be sent into the network, as described above, resulting in the discovery of a node having the ID "A", and subsequent receipt of its common ID list.

If it was desired to retrieve documents on the basis of the product X, then a probe 173C' for X would be provided for the Autoscan function, and corresponding nodes would be created for each document containing the unique identifier "X". If the supplier A is associated with other products Y, Z, and/or other suppliers are associated with the product X, then the results of searching for A and searching for X can be combined with a simple comparison program to determine those network addresses which occur in both results and these would be in respect of documents in which both A and X occur.

The concept of a group of interest has been described in terms of the Model URL which is common to that group. In the present invention, this Model URL is one example of a unique identifier. As mentioned, another example of a unique identifier is a postcode, and this can be used in a number of ways in accordance with the present invention.

In one embodiment, the "postcode" predefined software probe is arranged to recognise postcodes in accordance with any one of the following four character sequence templates:
alpha, numeric, space, numeric, alpha, alpha;
alpha, numeric, numeric, space, numeric, alpha, alpha;
alpha, alpha, numeric, space, numeric, alpha, alpha;
alpha, alpha, numeric, alpha, space, numeric, alpha, alpha.

In each of these templates, the alpha characters must be upper case.

Suppose that a first user wishes to publish information about a forthcoming jumble sale at a venue having the postcode GH7 8IJ, and creates a document containing the necessary details for the jumble sale and having "Public" status. The Autoscan function 173H recognises the postcode GH7 8IJ, and invokes the Publish Node function in respect of the Published Associations—GH7 8IJ:NA, GH7 8:NA; GH7:NA and GH:NA, where NA is the network address of the document. In postcode terminology, these represent the postcode, sector, district and area related to that postcode. A second user can perform a Search to find out what published information there is in respect of a given postcode, i.e. provide "GH7 8IJ" to his Search function. This will retrieve the published node "GH7 8IJ:NA", and, via its common ID list, all other published documents for that postcode. The second user can similarly perform sector, district and area searches using GH7 8, GH7 and GH, respectively.

In another example of the use of postcodes as unique identifiers, the first user wishes to disseminate a postcode for, say, a facility that has a related web page. The first user has used that facility and wishes to draw the attention of other people in his sector to that facility. He visits that web page, thus creating a web page viewing record, and while the page is displayed invokes the Assert function. An Assert window is now displayed having two boxes, one for the UIDp and the other for the UIDa. In this particular case, because the user invoked the Assert function while the page was being displayed, the URL of that page is automatically entered in the UIDa box, and the cursor is positioned at the start of the UIDp box waiting for data entry by the user.

Suppose that the user wants to associate that web page with the postcode sector "GH7 8". He types this postcode sector into the UIDp box. Once entry is complete, the Assert function calls the Publish Node function and a node 200 is created for the Published Association "GH7 8:URL". If one or more existing nodes 200 have this identity, "GH7 8", then their common ID lists are updated as described above, else a new node 200 is created.

Other users can search using "GH7 8" to find out what nodes have been created by users for information relating to that sector. Such a search will find a node having the identity "GH7 8" and retrieve its common ID list. This list can contain, for example, network addresses of data items that are retrievable from other computers 1, URLs that can be used directly by a browser, email addresses that can be used directly by an email handler, telephone numbers that can be used directly by a telephone dialler application, place names and GPS (global positioning system) coordinates that can be used directly by a map application, and calendar entries that can be used directly by a calendar application.

In a variant embodiment, when the Networker program receives a FOUND message (constituting a return message of the present invention) containing a common ID list, i.e. one or more data record second parts 202b, it immediately sends Retrieval messages to the network addresses in the list, but for each entry in the list which it recognises as not being a network address, it sends a respective FIND message. In one alternative, the Networker program displays a request window to the user asking if the retrieved UIDa is to be applied to an appropriate application on the computer, e.g. a URL applied to the browser. If the user selects No, then the Networker program proceeds to send a FIND message for that UIDa.

A retrieved UIDa can be the network address of a networked service, for example a chat room service, hosted on a remote computer of the network. In such a case, if the user sends a Retrieve message to that network address, this will invoke a data processing computer process 173Q for controlling the launch of that service, subject to any proviso in the corresponding set of rules relating to that service. Another of the data processing computer processes 173R controls the launch configuration of such a networked service, subject to any proviso in the corresponding set of rules relating to that service.

A user specifies which of a set of possible networked services are to be hosted on his computer, and which of the hosted services are to be made available to users at other computers, i.e. assigned "Public" status, by means of the set of rules. A rule can specify one or more particular services, or specify a group of services by a generic definition.

As described, some of the data processing computer processes are invoked automatically dependent upon the appropriate rulesets, and in this respect the term "user." and equivalent concepts, embrace both a computer per se (i.e. a non-human user) and a human user operating his computer and manually invoking data processing computer processes.

The invention claimed is:
1. A computer for use in managing a group of interest in a communications network of interconnected similar computers, the computer comprising:
storage locations for storing user data in the form of data items of a plurality of categories, each such stored data item having a network address by which it can be accessed;
a storage configured to store a plurality of search templates, each of the plurality of search templates being in the form of a respective pattern defining a respective set of strings;
a scanner arranged to automatically perform pattern matching through each such stored data item in accordance with each said search template to detect strings therein which are members of the defined set of strings of the particular search template;
a hierarchical tree of data records having a root node, at a lower level a plurality of internal nodes corresponding to said plurality of categories, and leaf nodes;
a data record processor which in response to the detection of a said string by the scanner creates in said hierarchical tree a leaf node descendent from the internal node corresponding to the category of that data item, the newly created leaf node having a first part formed by that detected string and a second part formed by the network address of the data item in which that string was detected,
at least the root node of the tree being associated with a respective rule-set comprising action-specific rules, and a requested action in respect of a leaf node being governed by the corresponding action-specific rule associated with that leaf node, and in the event that there is no such corresponding rule associated with that leaf node, the lowest level corresponding action-specific rule asso- ciated with an ancestral node of that leaf node, and ignored if no such associated corresponding action-specific rule exists, and each leaf node for which publication is permitted constituting a respective virtual node resident on said computer, the first and second parts of such a leaf node respectively constituting an identifier for that respective virtual node and a network address by which that respective virtual node may be addressed and actions requested in respect of its corresponding data item;

a searcher configured to search the communications network, in use, in respect of a newly created virtual node, to find an existing said virtual node having an identifier matching the identifier of the newly created virtual node, existing virtual nodes that have the same common identifier constituting a group of common interest wherein each member of that group knows the group membership; and an adder which in response to a successful search adds the newly created virtual node as a new member of that group.

2. The computer according to claim 1, further comprising an alerting unit which in response to receipt from an originating virtual node of a message for a virtual node resident on said computer, hereafter referred to as the receiving node, requests an action related to that receiving node, to provide an alert signal at that computer.

3. The computer according to claim 2, wherein the alerting unit is arranged to provide the alert signal in response to the requested action being the addition of the originating virtual node as a new member of the group membership of the receiving node.

4. The computer according to claim 2, wherein the data record of the root node is a user details record, and the alerting unit is arranged to generate a retrieval message for sending to that originating virtual node in respect of that user details record of the tree associated with that originating virtual node, and for displaying such user details received from the originating node.

5. The computer according to claim 4, wherein the alerting unit is responsive to input of a user command at that computer to send that retrieval message.

6. The computer according to claim 3, wherein the data record of the root node is a user details record, and the alerting unit is arranged to generate a retrieval message for sending to that originating virtual node in respect of that user details record of the tree associated with that originating virtual node, and for displaying such user details received from the originating node.

7. The computer according to claim 6, wherein the alerting unit is responsive to input of a user command at that computer to send that retrieval message.

8. A method of managing a group of common interest in a communications network of interconnected similar computers, the method comprising:

storing on a computer user data in the form of data items of a plurality of categories, each such stored data item having a network address by which it can be accessed;

scanning automatically through each such stored data item in accordance with each of a plurality of search templates, each search template being in the form of a respective pattern defining a respective set of strings, to detect strings therein which are members of the defined set of strings of the particular search template;

in response to the detection of a said string creating, in a hierarchical tree of data records on the said computer, the tree having a root node and at a lower level a plurality of internal nodes corresponding to said plurality of categories, a leaf node descendent from the internal node corresponding to the category of that data item, the newly created leaf node having a first part formed by that detected string and a second part formed by the network address of the data item in which that string was detected, at least the root node of the tree being associated with a respective rule-set comprising action-specific rules, and a requested action in respect of a leaf node being governed by the corresponding action-specific rule associated with that leaf node, and in the event that there is no such corresponding rule associated with that leaf node, the lowest level corresponding action-specific rule associated with an ancestral node of that leaf node, and ignored if no such associated corresponding action-specific rule exists, and each leaf node for which publication is permitted constituting a respective virtual node resident on said computer, the first and second parts of such a leaf node respectively constituting an identifier for that respective virtual node and a network address by which that respective virtual node may be addressed and actions requested in respect of its corresponding data item;

for such a newly created virtual node, searching the communications network for an existing said virtual node having an identifier matching the identifier of that newly created virtual node, existing virtual nodes that have the same common identifier constituting a group of common interest wherein each member of that group knows the group membership; and if the search successfully finds such an existing virtual node, adding the newly created virtual node as a new member of that group.

9. The method according to claim 8, further comprising alerting, responsive to receipt from an originating virtual node of a message for a virtual node resident on said computer, hereafter referred to as the receiving node, to request an action related to that receiving node, to provide an alert signal at that computer.

10. The method according to claim 9, wherein the alerting is arranged to provide the alert signal in response to the requested action being the addition of the originating virtual node as a new member of the group membership of the receiving node.

11. The method according to claim 9, wherein the data record of the root node is a user details record, and the alerting is arranged to generate a retrieval message for sending to that originating virtual node in respect of that user details record of the tree associated with that originating virtual node, and for displaying such user details received from the originating node.

12. The method according to claim 11, wherein the alerting is responsive to input of a user command at that computer to send that retrieval message.

13. The method according to claim 10, wherein the data record of the root node is a user details record, and the alerting is arranged to generate a retrieval message for sending to that originating virtual node in respect of that user details record of the tree associated with that originating virtual node, and for displaying such user details received from the originating node.

14. The method according to claim 13, wherein the alerting is responsive to input of a user command at that computer to send that retrieval message.

* * * * *